Jan. 22, 1957  E. P. MOSLO ET AL  2,778,062
PLASTIC MOLDING MACHINE
Filed Aug. 20, 1949  2 Sheets-Sheet 1

INVENTORS
ERNEST P. MOSLO &
BY ARTHUR H. RADDE

Hyde, Meyer, Baldwin & Doran
ATTORNEYS

Jan. 22, 1957 E. P. MOSLO ET AL 2,778,062
PLASTIC MOLDING MACHINE
Filed Aug. 20, 1949 2 Sheets-Sheet 2

INVENTORS
ERNEST P. MOSLO &
ARTHUR H. RADDE
BY
Hyde, Meyer, Baldwin & Doran
ATTORNEYS

United States Patent Office 2,778,062
Patented Jan. 22, 1957

2,778,062
PLASTIC MOLDING MACHINE

Ernest P. Moslo, Cleveland Heights, and Arthur H. Radde, Middlefield, Ohio; said Radde assignor to said Moslo Application August 20, 1949, Serial No. 111,428

3 Claims. (Cl. 18—30)

This invention relates to improvements in a molding machine and more particularly to novel construction of the heating chamber through which the raw material passes on its way to the injection nozzle.

One of the objects of the present invention is to provide novel arrangements in heating chambers wherein a through passageway extends longitudinally from the injection cylinder to the injection nozzle and a plurality of narrow passageways radiate outwardly from this narrow passageway.

Another object of the present invention is to provide, in a heating chamber, a plurality of narrow passageways radiating from a central passageway, and the cross section of said radiating passageways being less near the central passageway than at points removed therefrom.

Another object of the present invention is to provide a star shape chamber through which raw plastic material passes as it is heated on its way to the injection nozzle in an injection type molding machine.

A further object of the present invention is the provision of novel passageways through a heating chamber wherein all parts of the plastic material are located close to heated surfaces as the material passes through the heating chamber on its way to the injection nozzle.

A still further object of the invention is the provision of a heating chamber as described in the preceding paragraph wherein the passageways provide smooth flow surfaces for the material passing through the heating chamber.

Another object of the present invention is to provide passageways through a heating chamber wherein the material starts through a central passageway and is then deflected outwardly radially into a plurality of narrow passageways which radiate in different planes from the central passageway but all passageways lying in planes which include the axis of the central passageway, together with means in one portion of the chamber for deflecting the plastic material from the central passageway out into the radially extending passageways.

Other objects and advantages of the present invention will appear from the accompanying drawings and specification and the essential features will be set forth in the appended claims.

In the drawings, Fig. 1 is a central sectional view through a heating chamber and nozzle adapted for use with a standard type of molding machine, this view being taken along the line 1—1 of Fig. 2;

Fig. 9 is a sectional view of another modification taken along the line 9—9 of Fig. 10; while

It is common practice in machines for the injection molding of thermoplastics to utilize a heating chamber between the injection cylinder and the injection nozzle which leads directly to the mold. Such heating chambers commonly utilize a large chamber in the center of which is provided a "spreader" or other device for causing the raw plastic material to spread into a thin film adjacent the heating walls of the chamber on its way to the injection nozzle. It is an object of the present invention to provide improvements in this general type of heating chamber.

Figure 1:
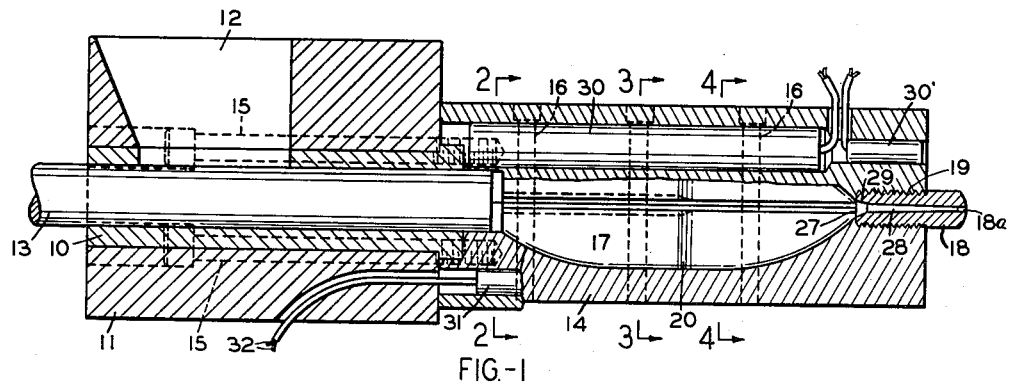

As shown in Fig. 1, a cylinder 10 is shown housed in a block 11 which has an opening 12 in the upper portion thereof adapted to be connected to a hopper through which raw granulated plastic material is fed to the injection cylinder. Mounted for reciprocation in the cylinder 10 is a piston or ram 13 which is supplied with means for reciprocating the same by means not shown but in any form which is well known in this art. Downstream in the flow of plastic material to the molding machine from the block 11 is the cylinder 14 which provides the heating chamber. This cylinder is sufficiently heavy to withstand the very great pressures usually involved in this process. The block 11 is secured to the cylinder 14 by means of a plurality of bolts 15. The cylinder 14 is made in upper and lower halves which meet at the parting line 14a of Figs. 2, 3 and 4 in the usual manner. These two halves of the cylinder 14 are secured together by a plurality of bolts 16. The walls of the cylinder 14 provide a central heating chamber 17. At the outlet end of this chamber the injection nozzle 18 is suitably secured in the cylinder block 14 as by means of the threads 19. It will be understood by those skilled in this art, that a suitable mold has a sprue which connects with the outlet channel 18a of the nozzle 18.

It will be understood by those skilled in this art that the piston or ram 13 reciprocates, receiving a new charge of plastic material each time that it clears the opening beneath the hopper mouth 12. Then, at the stroke of the ram 13 toward the right, as viewed in Fig. 1, the plastic material is moved through the heating chamber 17 from left to right and finally emerges in truly plastic form from the mouth 18a from the nozzle 18 into the mold itself.

Figure 2:
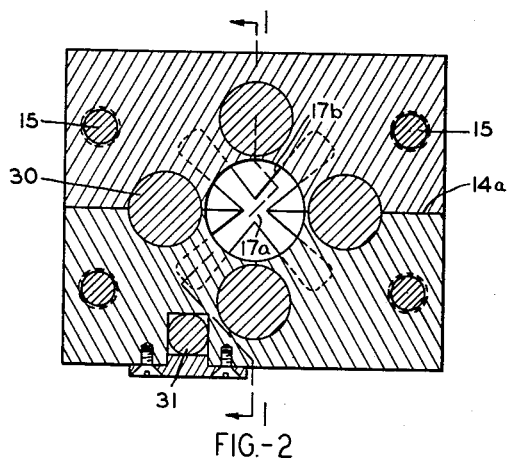
Figs. 2, 3 and 4 are transverse sectional views taken along similarly numbered lines of Fig. 1.
Figure 3:
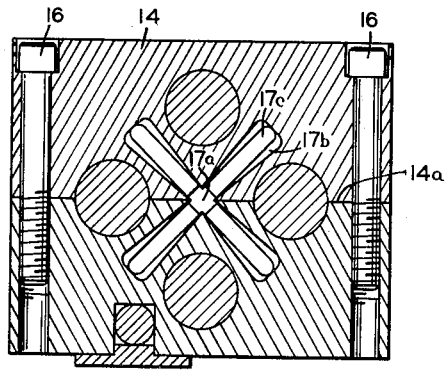

The present invention provides novel means for heating all parts of the raw plastic material on its way to the injection nozzle by means which places all parts of the heating chamber 17 close to the heated walls of the cylinder 14. As clearly shown in Figs. 1, 2, 3 and 4, the walls of the heating chamber provide a star shape passageway having a central or through passageway 17a and a plurality of narrow passageways 17b extending radially outwardly therefrom. In this form of our device, there are four of these passageways equally spaced about the central passageway. As shown in Figs. 2 and 3, the narrow passageways 17b are somewhat wider at the inlet end of the chamber or at the left hand end thereof as viewed in Fig. 1. Partially down the chamber, and approximately half way, each passageway 17b is narrowed down further to the section shown more clearly at 17c, Figs. 3 and 4. The passageways 17b blend smoothly into passageways 17c at zone 20 as indicated in Fig. 1. As is clearly shown in Figs. 1 and 4, these passageways 17c curve smoothly inwardly toward the central passageway 17a near the outlet end of the chamber becoming progressively of less extent radially as is quite visibly shown in Fig. 1 until the passageways 17c merge with the central passageway 17a at the outlet mouth 27. The nozzle 18 has a central through passageway 28 which is flared outwardly as indicated at 29 to match the mouth 27 of the heating chamber and to direct the flow of plastic material smoothly into the nozzle.

Preferably, each of the passageways 17b at the entrance end of the heating chamber is of greater cross sectional area than the passageway 17c near the exit end of the chamber. In order to obtain this additional cross sectional area of the passageway 17b without a large proportion of the raw finely divided plastic material tending to pass directly along the center line of the heating chamber, we have provided the novel construction clearly shown in Figs. 2 and 3. Here the passageway 17b is wider at its outer end than at its inner end. In one form of our invention, each of the passageways 17b is ⅜ of an inch wide at its outer end, 3/16 of an inch wide at its inner end near the center of the chamber, and about one inch from the center at the greatest depth. In this same device, the heating chamber is about 7 inches long with the wider passageway 17b extending about half way of the length and the narrower passageway 17c extending the final half portion of the length. One way to provide the passageway 17b of flaring construction as shown in Figs. 2 and 3, is to take the milling cutter which forms these passageways and cut a 3/16 inch passage all the way. Then swing the block 14 about its center a few degrees and cut a short depth in the lateral passageway. Then swing a few degrees more and cut a little deeper, thus flaring the cut and blending it smoothly. It results from this construction, that the finely divided plastic particles and pellets easily enter the widened passageways 17b at the left hand end of the heating chamber 17 as viewed in Fig. 1. During these early heating stages, none of the plastic material will be more than 3/16 of an inch away from a heated surface of the block 14. As the plastic material becomes melted and enters the passageway 17c to attain its full heat, practically none of the material will be more than 3/32 of an inch away from a heated wall surface.

Our novel arrangement of the passageways 17b and 17c makes it possible to arrange electrical heating cartridges in a novel manner so as to provide uniform heat to all parts of the chamber walls past which the plastic material flows through the heating chamber. As clearly shown in Figs. 2, 3 and 4, we prefer to use four heating cartridges 30 where we have four of the narrow passageways 17b and 17c. Each of these heating cartridges is positioned radially between an adjacent pair of radially extending passageways. This provides an even flow of heat through the block 14 to the walls of the two adjacent passageways located closest to the cartridge. With four narrow passageways ninety degrees apart, it is possible to move the cartridges close to the center of the heating chamber. The drawings show that a square enclosing the four cartridges will also enclose the four narrow passageways.

Figure 4:
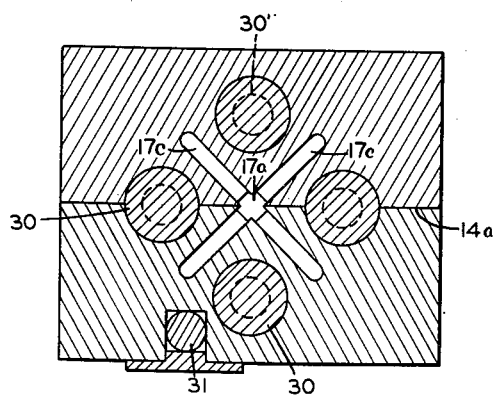

As shown in Figs. 1, 3 and 4, we may provide a cartridge thermoswitch 31 at a suitable location in the walls of the cylinder 14 with wires 32 leading away to a control instrument in a known manner. Sometimes additional heating cartridges 30' with associated thermostatic controls are located adjacent the nozzle 18, or adjacent the cylinder 10, and our invention contemplates switch control means where necessary.

It will be noted in Figs. 2, 3 and 4, that the parting line 14a bisects the angle between adjacent narrow passageways 17b and 17c directly above and below the parting line. It results from this construction that the open span across the central passageway 17a between these two points in the plane of the parting line is very narrow for a heating chamber of the capacity here disclosed. Thus the expansion forces are held mainly within the block and not exerted across much of a span at the parting line. The bolts 16 hold the block while forming. Later the block is brazed at the parting line 14a and forms one unit with no space for the plastic to get out.

Figure 5:
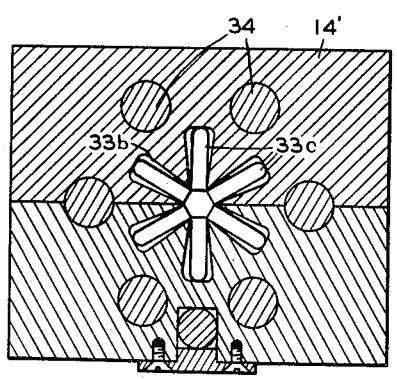
Fig. 5 is a sectional view similar to Fig. 3 through a modified form of my device.

In Fig. 5, we have shown a cross section taken through a cylinder 14' which is in all respects analogous to the cylinder 14 just described and the section of Fig. 5 is taken at a point analogous to the section of Fig. 3. Here there are six passageways 33b analogous to the passageways 17b of the first described form of my invention, these six being arranged sixty degrees apart in asterisk form. It will be understood that the passageways 33c represent a narrowing down from the wider passageways 33b analogous to the first described form and the passageways 33c will be narrowed toward the exit end of the heating chamber as is described in connection with Figs. 1 to 4 in the first described form. Here the heating cartridges 34 of electrical type are parallel to the central axis of the heating chamber and bisect the angle between adjacent passageways.

Figure 6:
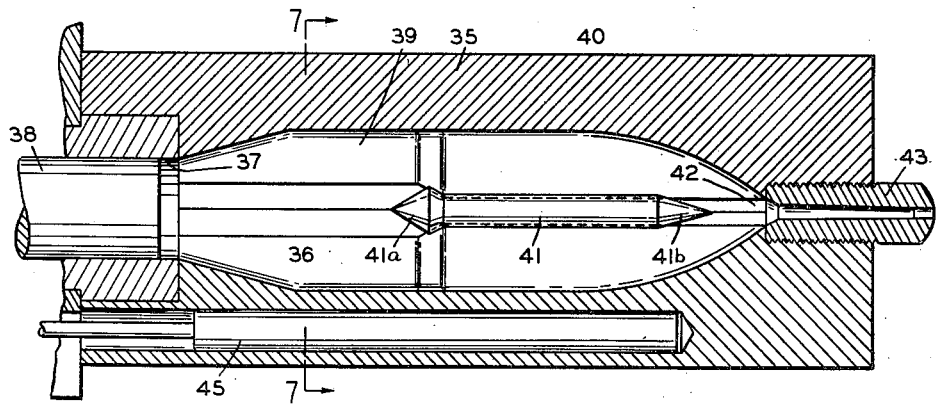
Fig. 6 is a central sectional view through another modification of my device.
Figures 7, 8:
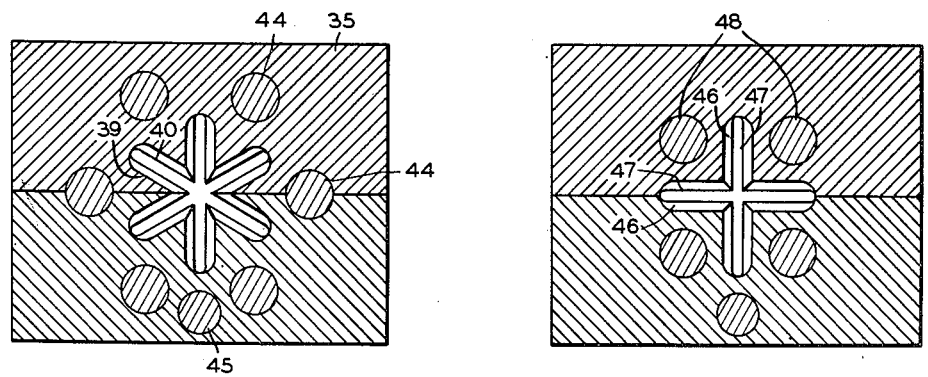
Fig. 7 is a sectional view along the line 7—7 of Fig. 6 with the torpedo removed to more clearly show the construction of the passageways.
Fig. 8 is a sectional view similar to Fig. 7 and taken in a similar position through a modified form of my invention.

In Figs. 6 and 7, we have shown a modification of the construction shown in Figs. 1 to 5 inclusive. Here the cylinder or block 35 is provided with a central through passageway 36 communicating with the cylinder 37 in which reciprocates the piston or ram 38. A plurality of passageways 39, six in number, extend radially outwardly from the central passageway 36 at the left hand end of Fig. 6. Approximately half way along the heating chamber, the passageways 39 narrow down to the passageways 40. Here, however, both passageways 39 and 40 have parallel side walls and there is a greater tendency for too much material to follow the central passage 36. Preferably, but not necessarily, we may provide at the downstream portion of the heating chamber, a torpedo shape 41 which substantially fills the central through passageway 36 for approximately half the length of the heating chamber. This torpedo form has an upstream point 41a which guides the plastic material radially outwardly from the central passageway 36 into the radial passageways 40. The downstream end of the torpedo has a sharp end 41b permitting the plastic material to converge at the mouth 42 of the heating chamber. Thence, the material flows into the injection nozzle 43 in the usual manner. Electrical heating cartridges 44 are provided analogous to the heating cartridges 30 of the first described form and a cartridge thermoswitch 45 is analogous to the control member 31 of the first described form.

It is obvious that in the form of our device shown in Figs. 6 and 7, that when the plastic material reaches that portion of the heating chamber where it is to be brought to its highest temperature, all parts of the plastic material are compelled to flow outwardly from the central passageway into the plurality of narrow passageways 40 compelled by the torpedo shape member 41. Thus, at this critical point in the heating chamber, no portion of the plastic is very far away from a heated wall of the block 35. In one form of our device, the actual distance between the parallel walls of each passageway 40 is about 3/16 of an inch. Therefore, in this form of our device no portion of the plastic material is more than 3/32 of an inch away from a heated wall. This is a very efficient device for heating the plastic material and lends itself to a very close control of the temperature of the plastic especially in those cases where such heating temperature is critical.

In Fig. 8, we have shown a modification of Figs. 6 and 7 where four passageways are used, instead of six. Here wider passageways 46 at the inlet end of the heating chamber blend into narrower passageways 47 at the outlet end of the chamber. Heating cartridges are shown at 48.

While we have shown electric cartridge heaters, it will be understood that other forms of heating may be used.

For instance band or strip heaters may be used. The cartridges have the advantage that the heat is applied close to the lateral passageways through which the plastic flows.

Figure 9:
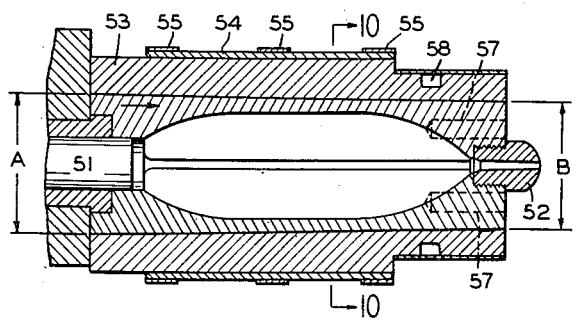
Figure 10:
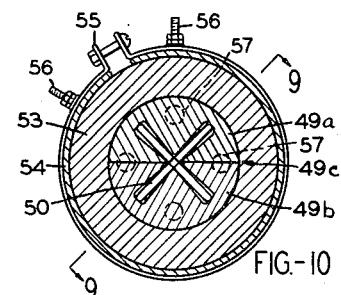
Fig. 10 is a sectional view taken along the line 10—10 of Fig. 9.

Another modification of our invention is shown in Figs. 9 and 10. Here two blocks 49a and 49b meet at a plane 49c. Formed in these blocks are four passageways 50 which are in all respects similar and analogous to the passageways 17a, 17b and 17c described in connection with Figs. 1, 2 and 3. The passageways 50 extend longitudinally through the blocks 49a and 49b from the ram end at 51 to the injection nozzle end at 52. In this form of our invention, we provide novel means for holding the blocks 49a and 49b tightly together along the plane 49c so that no plastic material may be squeezed out along the plane 49c when the heated plastic is under pressure from the ram 51. To this end, the blocks 49a and 49b are assembled endwise in the direction of the arrow of Fig. 9 into an uninterrupted sleeve 53 of metal adapted to stand high pressures. The blocks 49a and 49b appear to be approximately semi-cylindrical and the inner surface of the sleeve 53 appears to be generally cylindrical. Actually, the dimension at A Fig. 9 is slightly greater than the dimension at B Fig. 9. In other words, the mating surfaces of the blocks 49a and 49b with the interior surface of the sleeve 53 are slightly frusto-conical in shape and the angle of their meeting is a wedging angle so that once the blocks are placed inside of the sleeve they will not move out under any ram pressure no matter how great.

In this form of our device, the heating means for the main body of the plastic material in the passages 50 is supplied by band heaters indicated at 54 and held in place by clamping bands 55. Suitable electric current is supplied to the heating bands 54 by leads indicated at 56. The nozzle end of the chamber is heated by cartridge heaters 57 which are supplied with current by electrical conductors (not shown) which are accommodated in the annular groove 58.

In all forms of my invention I have shown an arrangement for heating plastic material while moving from an injection cylinder to an injection nozzle comprising a block of metal having a through passageway extending in the general direction of material travel and having a plurality of narrow passageways lying in planes passing through the central passageway and extending radially outwardly therefrom and in communication therewith, the radially extending passageways at their radially outermost ends being of less extent sectorially than the block of solid metal between them.

What we claim is:

1. Means for heating plastic material including two blocks meeting at a plane and extending from a ram end to a nozzle end, there being longitudinally extending passageways extending from end to end of said blocks and intercommunicating at said plane, the outer surfaces of said blocks when mutually engaged at said plane being frusto-conical in form, a sleeve adapted to stand heavy internal pressure embracing said blocks and holding them together, the internal surface of said sleeve being frusto-conical in form mating with the outer surfaces of said blocks, and the longitudinal elements of said frusto-conical form surfaces lying at a wedging angle to the axis of said frusto-conical forms.

2. Means for heating plastic material including two blocks meeting in a plane and extending from a ram end to a nozzle end, there being a through passageway in said blocks parallel to and adjacent said plane and extending from said ram end to said nozzle end, there being a plurality of narrow passageways lying in planes passing through said through passageway and extending radially outwardly therefrom and in communication therewith, no substantial part of said narrow passageways lying in said first named plane, and means holding said blocks together.

3. In a chamber for heating plastic material for molding, a block of metal having a central through passageway extending in the direction of material travel from injection cylinder to nozzle, a plurality of narrow passageways extending radially outwardly from said through passageway, said through passageway being narrow in width and extending the full length of said radial passageways, said radially extending passageways having substantially that same width adjacent said through passageway, and said radially extending passageways having a greater width at a zone removed from said through passageway, said radially extending passageways at their radially outermost ends being of less extent sectorially than the block of solid metal between them and being greater than the width of any other passageway portion.

References Cited in the file of this patent

UNITED STATES PATENTS

| | | |
|---|---|---|
| 1,745,482 | Goodwin | Feb. 4, 1930 |
| 2,057,945 | Gastrow | Oct. 20, 1936 |
| 2,193,787 | Berry | Mar. 19, 1940 |
| 2,308,867 | Dinzl | Jan. 19, 1943 |
| 2,480,838 | Caron | Sept. 6, 1949 |

FOREIGN PATENTS

| | | |
|---|---|---|
| 622,258 | Great Britain | Apr. 28, 1949 |